Patented Feb. 6, 1940

2,189,417

UNITED STATES PATENT OFFICE 2,189,417

ANTIOXIDANT

David Craig, Silver Lake, Ohio, assignor to The B. F. Goodrich Company, New York, N. Y., a corporation of New York No Drawing. Application September 30, 1937, Serial No. 166,577

15 Claims. (Cl. 260—800)

This invention relates particularly to the art of rubber manufacture and especially to the preservation of rubber and rubber goods against deterioration, but includes also the preservation of other organic materials which tend to deteriorate by absorption of oxygen from the air such as fatty oils, cracked gasoline and other petroleum products, essential oils, soaps, synthetic plastics, and the like.

It is well known that many organic substances undergo a more or less rapid deterioration which is commonly ascribed to the action of atmospheric oxygen. It has heretofore been proposed to retard or inhibit this deterioration by adding a small proportion of a phenol, an aromatic base, or some other like substance, termed generally an "antioxidant".

It is well known that aminophenols as a class have some activity an antioxidants, which activity varies with the particular compound selected. The antioxidant activity usually disappears, however, when any substitution is made upon the hydroxy group. Thus para-aminophenol is an antioxidant. Di-para-aminophenyl ether, however, possesses very little utility as an antioxidant. Other compounds formed by replacement of hydrogen on the hydroxy group are not, in general, good antioxidants.

I have discovered, however, that metallic salts of aminophenols are very effective in retarding the deterioration of rubber and like organic materials. The metallic portion of my new antioxidants is one of the metals in Group 1, 2, or 4 in Mendeleeff's Period table. For instance, the sodium, zinc, stannous, and magnesium salts of primary aminophenols such as para-aminophenol and ortho-aminophenol, of secondary aminophenols such as para-hydroxy diphenylamine (para-anilinophenol), para-hydroxyphenyl beta-naphthyl amine, para-hydroxy-N-phenyl glycine, and meta-methylaminophenol, and of tertiary aminophenols such as para-dimethylaminophenol, and para-hydroxy-N-phenyl morpholine are all good antioxidants. These compounds are mentioned merely for illustrative purposes, as the metallic salts of many other similar compounds have excellent age-resisting properties.

The metallic derivatives have many advantages over the parent compounds when they are used as antioxidants. In many rubber compositions, the color is an important consideration. Many very good antioxidants, however, cause a "staining" or discoloration which increases as the composition ages. This is particularly true in white rubber compositions, such as white pneumatic tire side-wall stocks, in which the tan and brown discolorations which are caused by many ordinary antioxidants are very undesirable. I have found that many of the metallic salts cause much less staining than their parent compounds and can therefore be employed in compositions in which it would be impossible to use the antioxidants from which they are derived.

Furthermore, the metallic derivatives, particularly the Group 2 and Group 4 metallic salts, are often more stable than the parent compounds. Stable antioxidants are desirable, both because they can be shipped and stored in the pure state and because master batches in which antioxidants are usually incorporated can be prepared and stored for long periods of time without any deterioration of the antioxidant or loss of antioxidant activity. The Group 1 metallic salts are particularly valuable in the latex field where water-soluble, basic antioxidants are desirable. Many water-insoluble antioxidants may be converted to soluble compounds by forming the sodium or potassium salt.

The metallic salts of this invention are very easily prepared by well-known methods. The zinc salt of para-hydroxy-N-phenylglycine, for instance, is prepared by dissolving para-hydroxy-N-phenyl glycine in water and precipitating with aqueous zinc carbonate. The zinc salt of para-hydroxy diphenylamine may be precipitated by zinc diethyl, which is a very useful reagent for preparing many zinc salts. Many other methods of preparing the various metallic salts of this invention will be obvious to those skilled in the art.

As an illustration of one manner of employing the antioxidants of this invention, a typical white sidewall composition is prepared containing rubber 100 parts by weight, lithopone 92 parts, zinc oxide 32 parts, ultramarine blue 0.35 part, paraffin 1.15 parts, sulfur 3.0 parts, heptaldehyde-aniline 0.17 part and the zinc salt of para-hydroxy-N-phenyl glycine 1.00 part. This composition is cured in a mold for 35 minutes at 270° F. to produce an optimum cure. When the same composition containing no antioxidant was subjected to the usual aging tests, it was found that the deterioration of the stock containing the antioxidant was only one-fifth as great as that of the same stock containing no antioxidant.

As another embodiment of the method of this invention, I prepared a rubber composition containing rubber 100 parts by weight, zinc oxide 5 parts, titanium dioxide 20 parts, whiting 80 parts, paraffin 1.0 part, sulfur 3.0 parts, mercaptobenzothiazole 0.9 part, tetraethyl thiuram disulfide 0.1 part, and the stannous salt of para-hydroxy diphenylamine 1.0 part. When this composition was cured and subjected to the usual aging tests, it was found that the deterioration of the stock containing the antioxidant was one-half to one-third as that of the same stock containing no antioxidant. Although para-hydroxy diphenylamine causes light-colored stocks to turn brown so rapidly that it cannot be used when color is important, the stannous salt of para-hydroxy diphenylamine causes very little staining of rubber stocks, even though they are aged for considerable periods. Para-hydroxy diphenylamine is an unstable compound which readily changes to a tarry mass when stored for a short time. Stannous para-hydroxy diphenylamine, however, is a stable compound which may be kept for months or even years without decomposition.

Any of the antioxidants within the scope of this invention may be similarly employed in any type of rubber composition, such as those used for automobile tires and tubes, hose, belting, sheet and thread rubber, rubberized fabrics, molded goods, seamless dipped goods, boots and shoes, etc. whether vulcanized in a mold, in open steam, in hot air, or even vulcanized in the cold by the so-called acid process. The proportion of antioxidant may vary from about 0.1% to 5%, although either smaller or greater proportions may be found useful, and it may be added to the rubber or other substance at any desired state of the preparation of the product. If the material to which it is added is a liquid such as a rubber cement, latex, cracked gasoline, or an oil, the antioxidant may simply be dissolved or suspended therein in a suitable small proportion, say 0.2% by weight. It is accordingly to be understood that the term "treating" is employed in the appended claim in a generic sense to embrace the incorporation of the antioxidant into a solid substance by milling or mastication, its addition to an aqueous dispersion such as rubber latex in a finely dispersed form, its solution in liquids, and any equivalent methods such as applying it to the surface of vulcanized or unvulcanized rubber in the form of a powder, paste, or solution.

The term "rubber" unless otherwise limited is likewise employed in a generic sense to include caoutchouc, balata, gutta-percha, reclaimed rubber, synthetic rubber, artificial rubber isomers, and like products, whether vulcanized or unvulcanized and whether or not admixed with fillers, pigments, vulcanizing and accelerating agents.

While I have herein disclosed certain specific embodiments of my invention, I do not intend to limit myself solely thereto, for many modifications including substituting materials having equivalent chemical properties and varying the proportions of materials used are within the spirit and scope of the invention as defined in the appended claims.

I claim:
1. The method of retarding the deterioration of an organic substance which tends to deteriorate by absorption of oxygen from the air which comprises treating the said substance with a metallic salt of an aminophenol, the metal being selected from the class consisting of Groups 1, 2, and 4, the metal having replaced the hydrogen of the hydroxy group.

2. The method of preserving rubber which comprises treating rubber with a metallic salt of an aminophenol, the metal being selected from the class consisting of Groups 1, 2, and 4, the metal having replaced the hydrogen of the hydroxy group.

3. The method of preserving rubber which comprises treating rubber with a stannous salt of a para-hydroxy diarylamine, the metal having replaced the hydrogen of the hydroxy group.

4. The method of preserving rubber which comprises treating rubber with the stannous salt of para-hydroxy diphenylamine, the metal having replaced the hydrogen of the hydroxy group.

5. The method of preserving rubber which comprises treating rubber with a stannous salt of a para-hydroxy-N-aryl glycine, the metal having replaced the hydrogen of the hydroxy group.

6. The method of preserving rubber which comprises treating rubber with the stannous salt of para-hydroxy-N-phenyl morpholine, the metal having replaced the hydrogen of the hydroxy group.

7. A composition comprising an organic substance which tends to deteriorate by absorption of oxygen from the air and a metallic salt of an amino phenol, the metal being selected from the class consisting of Groups 1, 2, and 4, the metal having replaced the hydrogen of the hydroxy group.

8. A rubber composition comprising rubber and a metallic salt of an amino phenol, the metal being selected from the class consisting of Groups 1, 2, and 4, the metal having replaced the hydrogen of the hydroxy group.

9. A rubber composition comprising rubber and a stannous salt of a para-hydroxy diarylamine, the metal having replaced the hydrogen of the hydroxy group.

10. A rubber composition comprising rubber and the stannous salt of para-hydroxy diphenylamine, the metal having replaced the hydrogen of the hydroxy group.

11. A rubber composition comprising rubber and the stannous salt of para-hydroxy-N-phenyl glycine, the metal having replaced the hydrogen of the hydroxy group.

12. A rubber composition comprising rubber and the stannous salt of para-hydroxy-N-phenyl morpholine, the metal having replaced the hydrogen of the hydroxy group.

13. The method of preserving rubber which comprises treating rubber with the stannous salt of a secondary aminophenol, the metal having replaced the hydrogen of the hydroxy group.

14. The method of preserving rubber which comprises treating rubber with the stannous salt of a tertiary aminophenol, the metal having replaced the hydrogen of the hydroxy group.

15. A rubber composition comprising rubber and a stannous salt of a secondary aminophenol, the metal having replaced the hydrogen of the hydroxy group.

DAVID CRAIG.